D. F. HIRSCHKORN.
MOTOR SLEIGH.
APPLICATION FILED SEPT. 23, 1910.
988,343.
Patented Apr. 4, 1911.
3 SHEETS—SHEET 3.
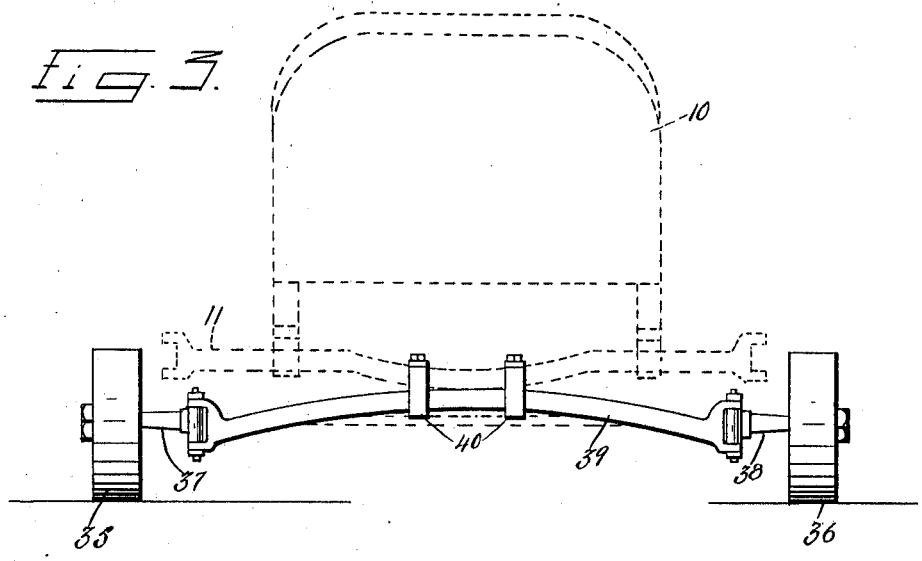
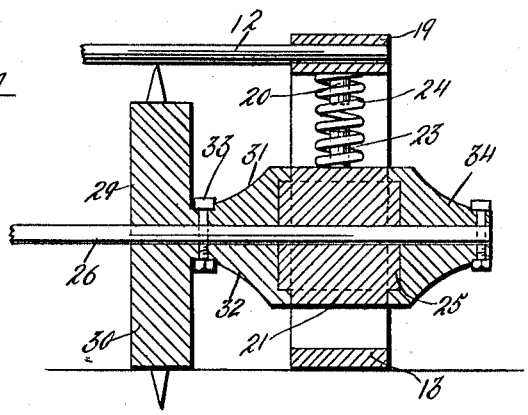
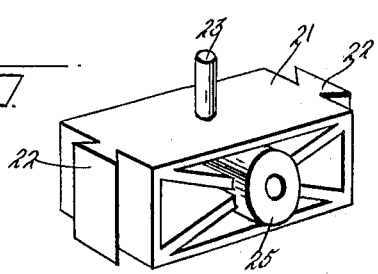
Witnesses
Inventor
D. F. HIRSCHKORN
By
Attorneys

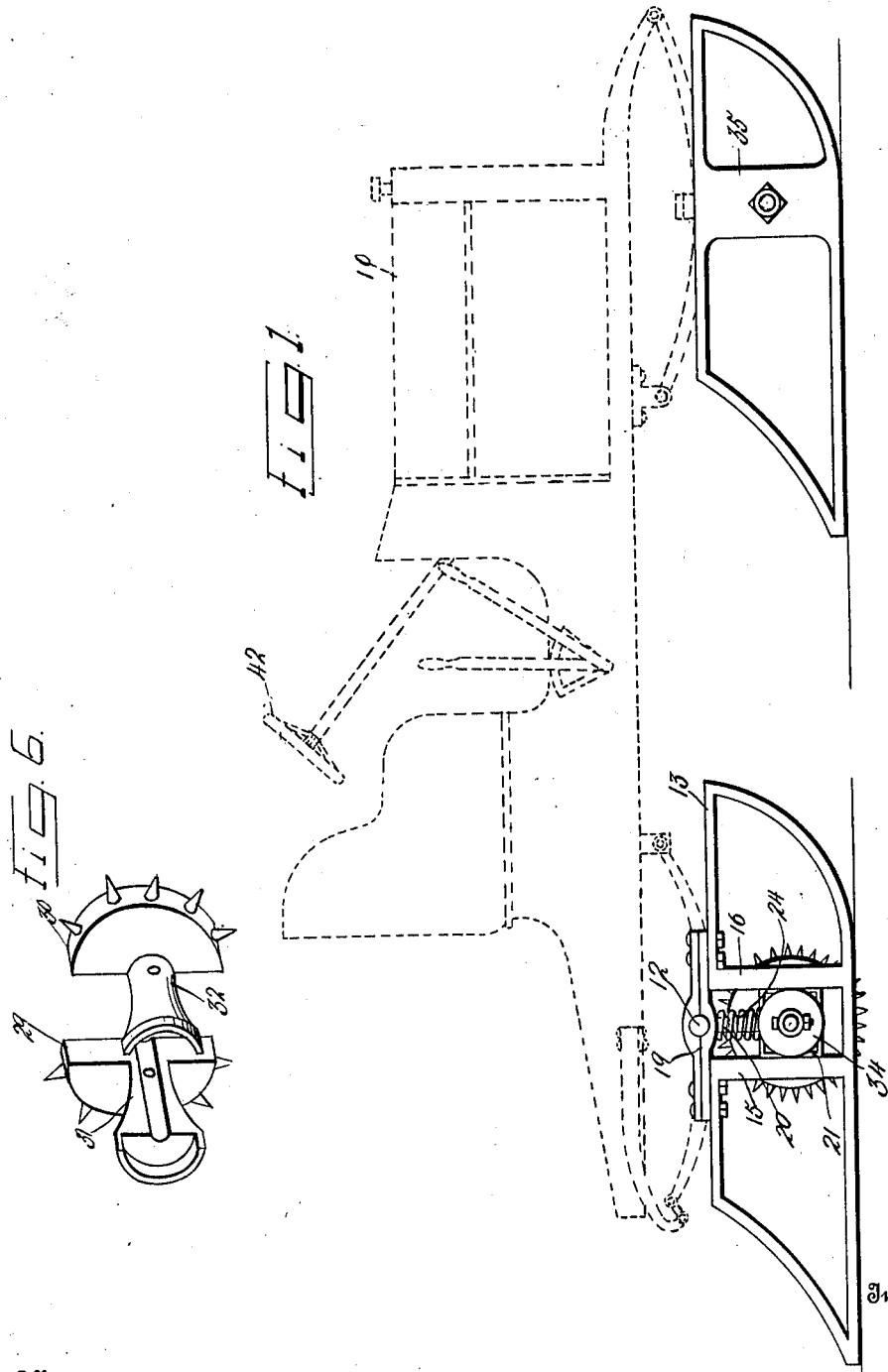

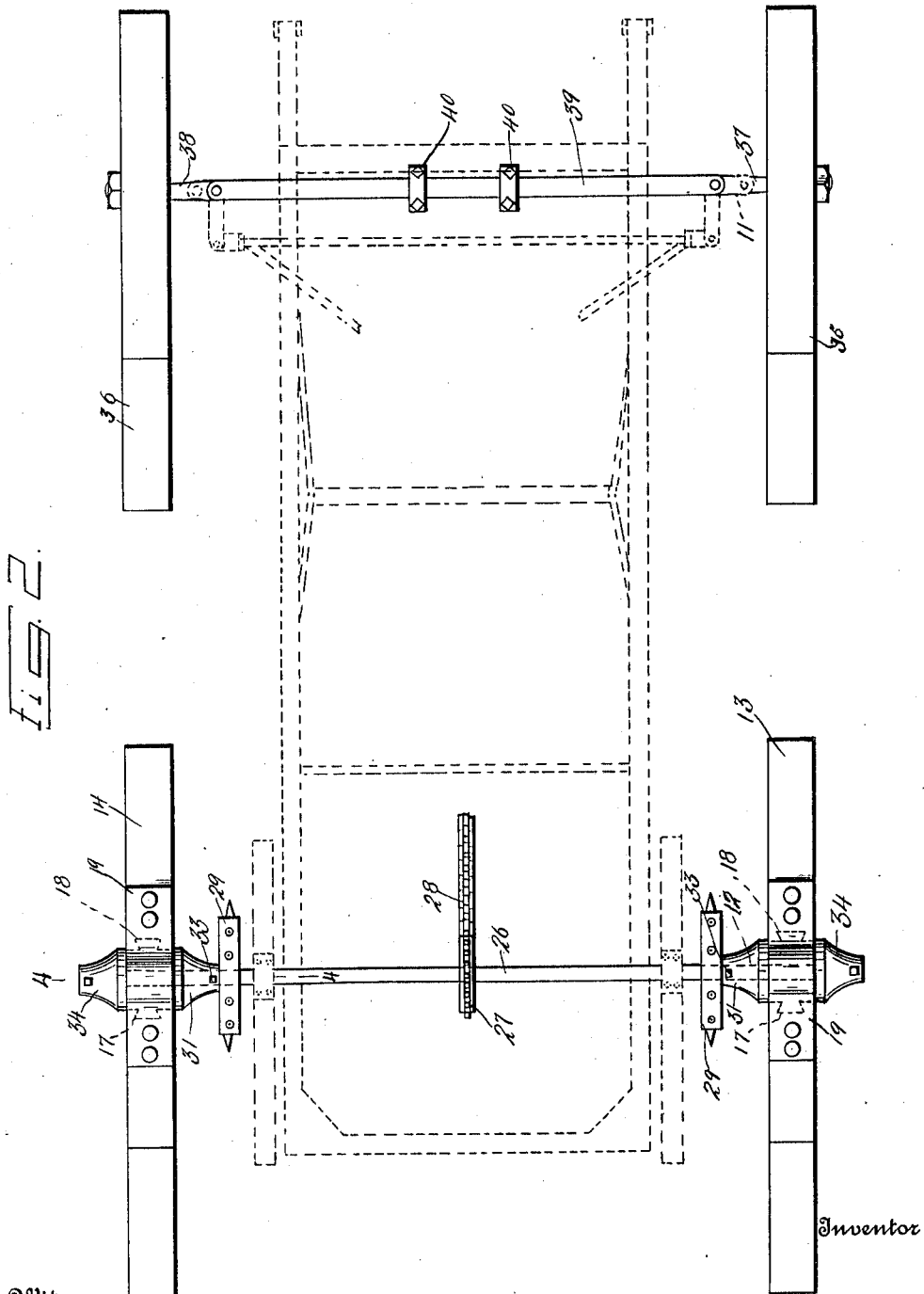

UNITED STATES PATENT OFFICE.

DANIEL F. HIRSCHKORN, OF LEAD, SOUTH DAKOTA.

MOTOR-SLEIGH.

988,343. Specification of Letters Patent. Patented Apr. 4, 1911.

Application filed September 23, 1910. Serial No. 583,474.

*To all whom it may concern:*

Be it known that I, DANIEL F. HIRSCHKORN, a citizen of the United States, residing at Lead, in the county of Lawrence, State of South Dakota, have invented certain new and useful Improvements in Motor-Sleighs; and I do hereby declare the following to be a full, clear, and exact description of the invention, such as will enable others skilled in the art to which it appertains to make and use the same.

This invention relates to motor sleighs.

The object of the invention resides in the construction of a motor sleigh which includes front and rear bobs, and to which latter the body and axles of an ordinary automobile can be easily and quickly connected without in any manner altering the parts of the automobile body or axles.

A further object of the invention resides in so constructing the front bob of the sleigh that the steering apparatus of the automobile can be easily and quickly connected therewith so as to effect the proper steering of the sleigh through the medium of the automobile steering apparatus.

With the above and other objects in view, the invention consists in the details of construction and in the arrangement and combination of parts to be hereinafter more fully described and particularly pointed out in the appended claims.

In describing the invention in detail, reference will be had to the accompanying drawings, wherein like characters of reference denote corresponding parts in the several views; and in which, Figure 1 is a side elevation of a motor sleigh constructed in accordance with the invention, the body thereof being shown in dotted lines; Fig. 2, a plan view of what is shown in Fig. 1, with the body removed; Fig. 3, a front view of the improved motor sleigh; Fig. 4, a section on the line 4—4 of Fig. 2; Fig. 5, a detail perspective view of one of the bearings of the tractor wheel shaft carried by the rear bob; and, Fig. 6, a detail perspective view of the tractor wheel sections.

Referring to the drawings, 10 indicates the body of the sleigh which is constructed similar to the ordinary automobile body and carries front and rear axles 11 and 12 respectively.

The rear bob of the sleigh comprises the runners 13 and 14, each of which includes spaced vertical guide members 15 and 16 provided on their adjacent vertical faces with dove-tailed grooves 17 and 18 respectively. Supported upon the upper portion of each runner 13 and 14 is a bearing 19 which extends across the space between the guide members 15 and 16 and carries on its lower side a lug 20 extending between the members 15 and 16 for a purpose that will presently appear. These bearings 19 rotatably support the rear axle 12 of the body 10. Disposed between each pair of guide members 15 and 16 is a frame 21 which has formed on opposite sides dove-tail projections 22 which travel in the grooves 17 and 18, whereby said frames are capable of an up and down movement between the guide members 15 and 16. A stud 23 projects upwardly from the top of the frame 21 and a spring 24 having one end encircling the stud 23 and its other end encircling the lug 20 constantly tends to move the frame 21 toward the base of its respective runner.

Formed integral with the frame 21 and extending longitudinally thereof is a bearing 25 which projects slightly beyond each end of the frame. Journaled in these bearings 25 is a shaft 26 which carries at its central portion a sprocket wheel 27, whereby said shaft may be operatively connected with the rear axle 12 by means of a sprocket chain 28. Fixed on each end of the shaft 26 just inward of the frame 21 is a tractor wheel which is formed of independent sections 29 and 30 provided respectively with extensions 31 and 32 which constitute a cup bearing and receive the inner projecting end of the bearing 25. The sections of the tractor wheel are fixed upon the shaft 26 by means of a suitable bolt 33 passing through the extensions 31 and 32 and through the shaft 26. A cup washer 34 is fixed on each end of the shaft 26 and receives the outer projecting end of the adjacent bearing 25.

The front bob comprises spaced runners 35 and 36 which have secured thereto inwardly extending arms 37 and 38 respectively which are pivotally connected with opposite ends of a supplementary axle 39. The front axle 11 of the body 10 is supported upon the supplementary axle 39 and secured thereto by means of clamps 40. The supplementary axle 39 and the arms 37 and 38 being arranged and constructed of the front axle of an automobile, the steering gear of the sleigh is connected with said arm of the supplementary axle so as to effect the steering of the front bob through the medium of the steering wheel 42 carried by the body 10.

What is claimed is:—

1. In a motor sleigh, the combination with a body having front and rear axles, of a rear bob supporting the rear axle, said rear bob comprising a pair of spaced runners each including spaced vertical guide members, a frame slidably mounted between the vertical guide members of each runner, a bearing formed integral with said frames and projecting beyond each end of the latter, a shaft journaled in said bearings, a tractor wheel fixed on said shaft inward of each frame, each of said tractor wheels comprising separate sections, each of said sections including an extension forming a cup washer receiving the inner projecting end of the bearing, connections between the shaft carrying the tractor wheel and the rear axle of the body, whereby the rotation of said axle will rotate the shaft, and a front bob supporting the front axle of the body.

2. In a motor sleigh, the combination with a body having front and rear axles, of a rear bob supporting the rear axle, said rear bob comprising a pair of spaced runners each including spaced vertical guide members, a frame slidably mounted between the vertical guide members of each runner, a bearing formed integral with said frames and projecting beyond each end of the latter, a shaft journaled in said bearing, a tractor wheel fixed on said shaft inward of each frame, each of said tractor wheels comprising separate sections, each of said sections including a section forming a cup washer receiving the inner projecting ends of the bearing, a cup washer on each end of the shaft receiving the outer projecting end of each bearing, connections between the shaft carrying the tractor wheel and the rear axle of the body, whereby the rotation of said axle will rotate the shaft, and a front bob supporting the front axle of the body.

In testimony whereof, I affix my signature, in presence of two witnesses.

DANIEL F. HIRSCHKORN.

Witnesses:
O. R. JEPSEN,
JESSIE AULTMAN.